J. W. SOUTH.
SAFETY DEVICE FOR PICTURE PROJECTING APPARATUS.
APPLICATION FILED APR. 21, 1920.

1,376,297.

Patented Apr. 26, 1921.
2 SHEETS—SHEET 1.

Inventor
Joseph W. South.

J. W. SOUTH.
SAFETY DEVICE FOR PICTURE PROJECTING APPARATUS.
APPLICATION FILED APR. 21, 1920.

1,376,297.

Patented Apr. 26, 1921.
2 SHEETS—SHEET 2.

Inventor
Joseph W. South

By Bradford Morrill Bierman
Attorneys.

UNITED STATES PATENT OFFICE.

JOSEPH W. SOUTH, OF MEMPHIS, TENNESSEE.

SAFETY DEVICE FOR PICTURE-PROJECTING APPARATUS.

1,376,297.   Specification of Letters Patent.   Patented Apr. 26, 1921.

Application filed April 21, 1920. Serial No. 375,516.

*To all whom it may concern:*

Be it known that I, JOSEPH W. SOUTH, a citizen of the United States, residing at Memphis in the county of Shelby and State of Tennessee, have invented certain new and useful Improvements in Safety Devices for Picture-Projecting Apparatus, of which the following is a specification.

This invention relates to fire prevention apparatus for moving picture machines and has for an object to provide new and improved means to introduce an obstruction between the source of light and the film to protect the film from overheating by the focused rays of light in case of breakage, or any interruption of the movement of the film in normal direction, such as may be caused by buckling, splitting, piling up, or other cause, as will be readily understood.

Further object of the invention is to provide a closure for the light-projecting tube to retain the light rays wholly within the projecting tube.

With these and other objects in view the device comprises certain novel units, elements and combinations as will be hereinafter more fully described and claimed.

Referring to the accompanying drawings which are made a part hereof and on which similar reference characters indicate similar parts,—

Figure 1 is a view of the device in side elevation, parts of a conventional projecting apparatus being dotted in.

It is well known that the film of a moving picture projector operates continuously in the focus of the light rays from the projecting lantern which focus produces a very high temperature at the film, which is inflammable. The present invention comprises means to be associated with the hood or light tube 10 of a projecting lantern for closing the light aperture in case of breakage or any interruption of the normal movement of the film, such closure comprising a cover member 11 hinged to the projecting tube as at 12.

Figure 1:
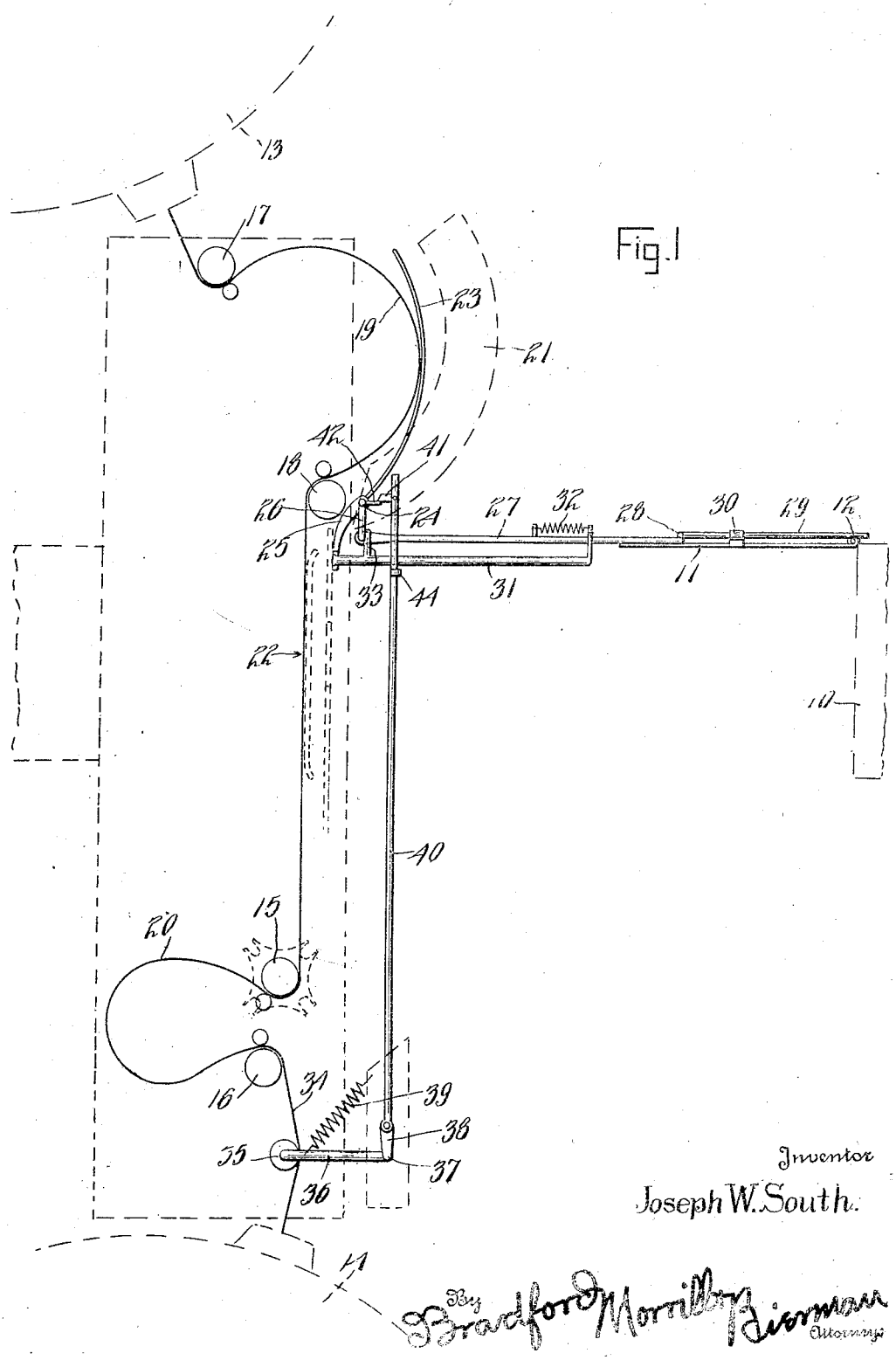
Figure 2:
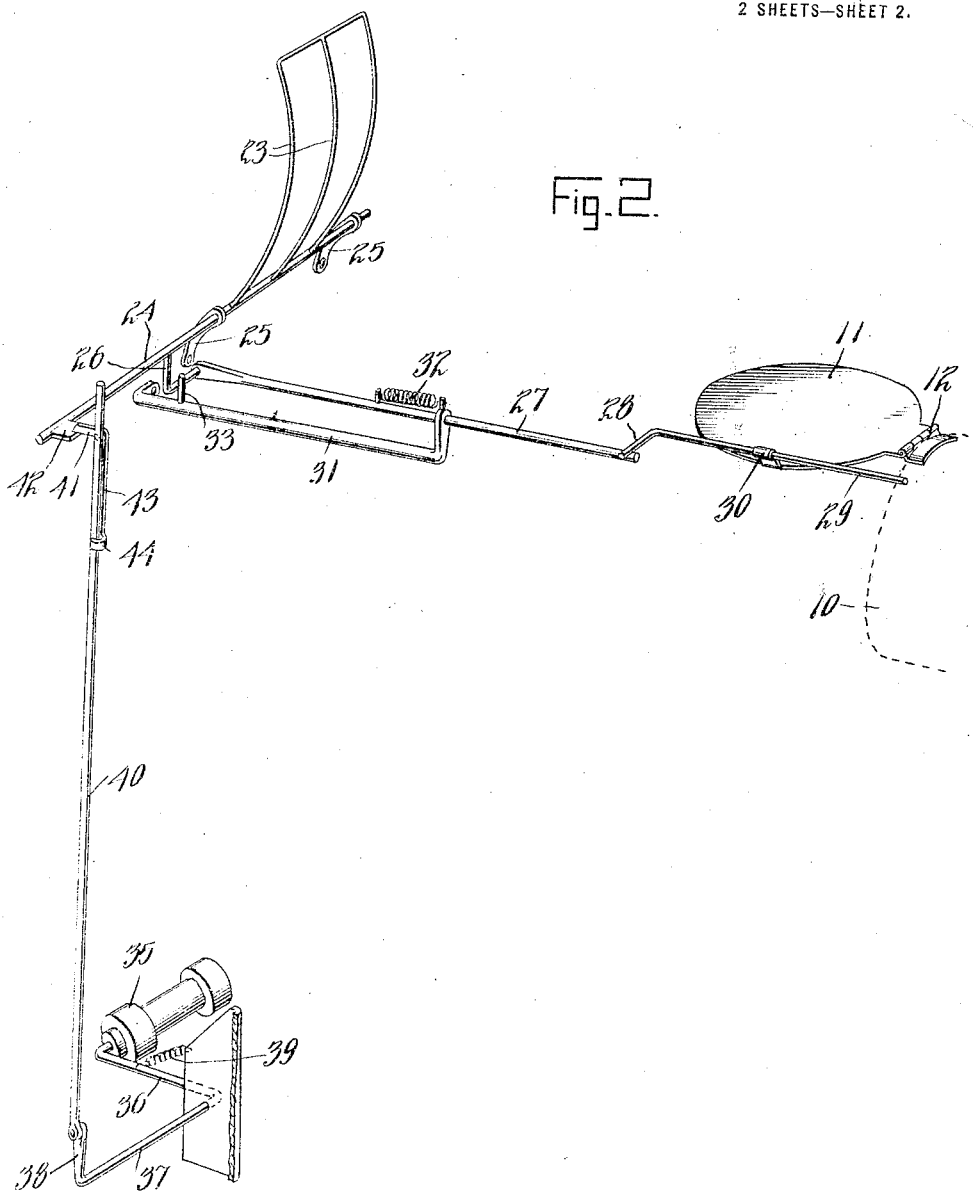
Fig. 2 is a perspective view of the invention disassociated from the projecting apparatus.

To maintain the closure ordinarily at open or projecting position and to close it automatically at the breaking of the film the apparatus of the present application is associated with the film feeding device. At Fig. 1 the film magazine is indicated at 13 and the take-up reel at 14. Between the magazine and the take-up reel are positioned the usual feeding mechanisms comprising the Geneva movement 15, the uniformly driven rollers 16 and 17 and the idle roller 18. No attempt has been made to illustrate this feeding mechanism as actual operating devices, such mechanism being too well known to require illustration. The mechanisms provide a loop 19 and a loop 20 in the film for permitting the proper actuation by the Geneva movement. Upon the machine, usually upon the door, a shield 21 is positioned, into which, at times, especially times of breakage or interruption, the loop 19 is projected by enlargement. The breakage of the film or interruption from other cause ordinarily occurs at or about the exposure aperture indicated by the arrow 22. In case of such interruption the Geneva feed continues to draw down the portion of the film below the aperture 22 but passage of the film over the roller 18 stops. The uniform feed roller 17, therefore enlarges the loop 19. At the rear of the loop 19 and positioned to swing backwardly into the shield 21 a hand 23 is provided, mounted upon a rock shaft 24, journaled to the projecting mechanism in any approved manner as by the brackets 25. Rock shaft 24 carries an arm 26 pivoted to a detent rod 27 which extends outwardly beneath a finger 28, secured to the closure 11 in any approved manner, as by being formed integral with the wire 29, secured to the closure 11 by the clips 30. The rod 27 is mounted to reciprocate in any approved type or mechanism as the bracket 31 and a spring 32 is employed to hold the rod 27 normally and yieldingly beneath the finger 28. A stop 33 is also provided to limit the movement of the arm 26 being here shown as carried rigidly by the bracket 31, it being understood, however, that the manner of supporting or mounting the stop 33 is not essential.

In case of interruption of the film the Geneva feed and the uniformly driven roller 16 continue to feed the lower severed section of the film until such section passes over the roller 16 whereupon the section 34 of the film between the roller 16 and the magazine 14 is released from engagement, A roller 35, forming a part of the present invention, is carried by an arm 36 which in turn is carried by or integral with a rock shaft 37 with a lever 38 carried thereby standing normally substantially vertical. A spring 39 is provided tending to hold the roller 35 against the section 34 of the film and in case of interruption and release of such section to draw the roller 35 out of normal position. The swinging of the roller 35 causes the lever 38 to draw downwardly on the rod 40 which is provided with a detent 41 engaging a wing 42 upon the rock shaft 24. The swinging of the roller 35 will, therefore, draw down the wing 42 rocking the shaft 24, the effect being exactly the same as when such rock shaft is actuated by the hand 23. The detent 41 is adapted to permit the rod 40 to be moved upwardly to normal position passing the wing 42. As shown in the drawing the detent is provided with an arm 43 having a hook 44 hooking over the rod 40 permitting the lever to swing in one direction or to resist movement in the opposite direction.

It will therefore be seen that whenever breakage or interruption occurs in the film the mechanism is adapted to employ a change in the condition of the film either above or below the exposure aperture to trip and close the closure 11 to interrupt the light projected upon the film. In view of the speed at which a film travels past the exposure aperture, the closure or cover member 11 closes almost instantaneously upon the interruption of such film.

In operation the parts will be associated as shown in the drawings. When interruption of the film occurs loop 19 will be enlarged because of the failure of the Geneva movement to continue feeding the film also the section 34 will be released by the continued feeding of the uniformly driven roller 16, in both cases the cover member 11 will be released by rocking the rock shaft 2 and drawing the rod 27 from supporting position under the finger 28.

Having thus fully described my said invention what I claim as new and desire to secure by Letters Patent, is:

1. The combination with a picture projecting apparatus embodying a source of light, a film spanning a projecting aperture and film moving mechanism upon opposite sides of the aperture, of a rock-shaft horizontally mounted upon the apparatus, a closure for the source of light, a detent movable with the rock-shaft tending to normally hold the closure open, rock-shaft operating mechanisms on opposite sides of the aperture and means whereby a change in position of the film upon either side of the aperture moves the rock-shaft operating mechanisms from normality to release the closure.

2. The combination with a picture projecting apparatus embodying a source of light, a film spanning a projecting aperture and film moving mechanism upon opposite sides of the aperture, of a rock-shaft mounted horizontally above the aperture, a closure for the source of light having a finger extending therefrom, a bracket secured to the apparatus below the rock-shaft, a detent rod movable with the rock-shaft and supported by the bracket, said detent rod normally supporting the closure by engagement with the finger thereon, rock-shaft operating mechanisms on opposite sides of the aperture, and means whereby a change in position of the film upon either side of the aperture moves the rock-shaft operating mechanisms from normality to release the closure.

3. The combination with a picture projecting apparatus embodying a source of light, a film spanning a projecting aperture and film moving mechanism upon opposite sides of the aperture, of a rock-shaft mounted horizontally above the aperture and provided with an arm extending therefrom, a closure for the source of light having a finger extending therefrom, a detent rod secured to the arm of the rock-shaft and supported for sliding movement, said detent rod adapted to support the closure by engagement with the finger thereon when the rod is extended to normality, means to normally keep the detent rod in extended position, means to limit the extension of the detent rod, rock-shaft operating mechanisms on opposite sides of the aperture and means whereby a change in position of the film upon either side of the aperture withdraws the detent rod from normality to release the closure.

4. The combination of a picture projecting apparatus embodying a source of light, a film spanning a projecting aperture, film feeding mechanisms adapted to maintain a loop between the projecting aperture and the source of film supply and to maintain a relatively taut section between the aperture and the storage position of the film, of a rock-shaft mounted horizontally above the aperture, a closure for the source of light, a detent movable with the rock-shaft tending to normally hold the closure open, means positioned adjacent the loop adapted to release the detent upon enlargement of the loop or interruption of the film and means engaging the relatively taut section to release the detent upon the release of the taut section.

5. The combination of a picture projecting apparatus embodying a source of light, a film spanning a projecting aperture, film feeding mechanisms adapted to maintain a loop between the projecting aperture and the source of film supply and to maintain a relatively taut section between the aperture and the storage position of the film, of a rock-shaft mounted horizontally above the aperture, a closure for the source of light having a finger extending therefrom, a bracket secured to the apparatus below the rock-shaft, a detent rod movable with the rock-shaft and supported by the bracket, said detent rod normally supporting the closure by engagement with the finger thereon, means positioned adjacent the loop adapted to rock the rock-shaft and release the detent upon enlargement of the loop in consequence of an interruption of the film and means engaging the relatively taut section adapted to rock the rock-shaft and release the detent upon the release of the taut section.

6. The combination with a picture projecting apparatus embodying a source of light, a film spanning a projecting aperture and film feeding mechanism adapted to maintain a loop in the film above the aperture, of a rock-shaft mounted horizontally above the aperture, a closure for the source of light having a finger extending therefrom, a bracket secured to the apparatus below the rock-shaft, a detent rod movable with the rock-shaft and supported by the bracket, said detent rod normally supporting the closure by engagement with the finger thereon and means whereby an expansion of the loop of film moves the rock-shaft operating mechanism from normality to release the closure.

7. The combination with a picture projecting apparatus embodying a source of light, a film spanning a projecting aperture and film feeding mechanism adapted to maintain a loop in the film above the aperture, of a rock-shaft mounted horizontally above the aperture and provided with an arm extending therefrom, a closure for the source of light having a finger extending therefrom, a bracket secured to the apparatus below the rock-shaft, a detent rod secured to the arm of the rock-shaft and supported by the bracket, said detent rod adapted to support the closure by engagement with the finger thereon when the rod is extended to normality, means to normally keep the detent rod in extended position, means to limit the extension of the detent rod and means whereby a change in position of the film above the aperture withdraws the detent rod from normality to release the closure.

8. The combination of a picture projecting apparatus embodying a source of light, a film spanning a projecting aperture, film feeding mechanism adapted to maintain a relatively taut section between the aperture and the storage position of the film, of a rock-shaft mounted horizontally above the aperture, a closure for the source of light, a detent movable with the rock-shaft tending to normally hold the closure open, a bracket for constraining the motion of the detent, and means engaging the relatively taut section to release the detent upon release of the taut section.

9. The combination of a picture projecting apparatus embodying a source of light, a film spanning a projecting aperture, film feeding mechanism adapted to maintain a relatively taut section between the aperture and the storage position of the film, of a rock-shaft mounted horizontally above the aperture and provided with an arm extending therefrom, a closure for the source of light having a finger extending therefrom, a bracket secured to the apparatus below the rock-shaft, a detent rod secured to the arm of the rock-shaft and supported by the bracket, said detent rod adapted to support the closure by engagement with the finger thereon when the rod is extended to normality, means to normally keep the detent rod in extended position, means to limit the extension of the detent rod, rock-shaft operating mechanism providing means whereby a change in the relatively taut section withdraws the detent rod from normality to release the closure.

10. In a picture projecting apparatus having a moving light-transmitting film, and means to maintain a loop therein, a source of light and a hood having an opening for directing the light, the combination of a shutter pivoted at the top of the hood and tangentially to the periphery of the opening to cut off the light at times, a detent to hold the shutter normally in open position, means attached to the detent adapted to contact with an abnormal loop in the film to release the detent and allow the shutter to fall to cut off the light and a bracket for supporting and guiding the detent.

11. In a picture projecting apparatus having a moving light-transmitting film, and means to maintain a loop therein, a source of light and a hood for directing the light, the combination of a shutter pivoted at the top of the hood to cut off the light at times, a slidable detent to normally hold the shutter in open position, a wing attached to the detent and means in contact with a portion of the film at a distance from the wing and adapted on rupture of the film to move the wing and release the detent thereby allowing the shutter to fall and cut off the light.

12. In a picture projecting apparatus having a moving light-transmitting film, and means to maintain a loop therein, a source of light and a hood for directing the light, the combination of a shutter pivoted at the top of the hood to cut off the light at times, a slidable detent to normally hold the shutter in open position, a wing attached to the detent and means held in position by the tension of the film and adapted when released to actuate the wing and detent, said means comprising a link adapted to engage the wing, a member normally connected thereto and a fixed support in which said latter member is pivoted.

13. In a picture projecting apparatus having a moving light-transmitting film, and means to maintain a loop therein, a source of light and a hood for directing the light, the combination of a shutter pivoted at the top of the hood to cut off the light at times, a detent to hold the shutter normally in open position, a wing having a pivotal connection with the detent and adapted to be moved by an abnormal loop to release the detent and allow the shutter to fall and thereby cut off the light.

14. In a picture projecting apparatus, a film, a source of light, a hood having an opening therefor, a shutter pivoted tangentially to the periphery of the opening of the hood, and extending toward the film when open, and a detent movable toward and from the shutter, and adapted in one position to engage the shutter to hold it open.

15. In a picture projecting apparatus, a film spanning a projecting aperture, a source of light, a hood therefor having an opening, a shutter pivoted tangentially to the periphery of the opening of the hood, and extending toward the film when open, a detent movable toward and from the shutter, and adapted when moved toward the shutter to engage the shutter and hold it open, and means at each side of the projecting aperture controlled by the film and adapted to withdraw said detent.

16. In a picture projecting apparatus, a film spanning a projecting aperture, a source of light, a hood therefor having an opening, a shutter pivoted tangentially to the periphery of the opening of the hood, and extending toward the film when open, and a detent movable toward and from the shutter, and adapted when moved toward the shutter to engage the shutter and hold it open, and means whereby a change in the position of the film at either side of the projecting aperture may retract said detent and permit the shutter to close.

17. In a picture projecting apparatus, a film, a source of light, a hood therefor having an opening, a shutter pivoted tangentially to the periphery of the opening of the hood, and extending toward the film when open, a detent movable toward and from the shutter and adapted to hold the shutter open, and means engaging a relatively taut section of the film and adapted to retract said detent upon release of tension in the taut section.

In witness whereof, I have hereunto set my hand and seal at Memphis, Tennessee, this 6th day of April, A. D. nineteen hundred and twenty.

JOSEPH W. SOUTH. [L. S.]

Witnesses:
R. E. SMITH,
JOHN W. FARLEY.